(12) United States Patent
Kidachi

(10) Patent No.: US 9,894,850 B2
(45) Date of Patent: Feb. 20, 2018

(54) DRIPPER AND DRIP IRRIGATION TUBE

(71) Applicant: Enplas Corporation, Saitama (JP)

(72) Inventor: Masahiro Kidachi, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 14/913,902

(22) PCT Filed: Aug. 25, 2014

(86) PCT No.: PCT/JP2014/072113
§ 371 (c)(1),
(2) Date: Feb. 23, 2016

(87) PCT Pub. No.: WO2015/029932
PCT Pub. Date: Mar. 5, 2015

(65) Prior Publication Data
US 2016/0205878 A1    Jul. 21, 2016

(30) Foreign Application Priority Data

Aug. 26, 2013  (JP) .................................. 2013-174417
Sep. 25, 2013  (JP) .................................. 2013-198306

(51) Int. Cl.
*A01G 25/00*  (2006.01)
*A01G 25/02*  (2006.01)

(52) U.S. Cl.
CPC .................... *A01G 25/023* (2013.01)

(58) Field of Classification Search
CPC .............................. A01G 25/02; A01G 25/023
(Continued)

(56) References Cited

U.S. PATENT DOCUMENTS 4,281,798 A    8/1981  Lemelstrich
5,052,625 A   10/1991  Ruskin
(Continued)

FOREIGN PATENT DOCUMENTS

EP    0059922 A1    9/1982
JP    S55-045399 A  3/1980
(Continued)

OTHER PUBLICATIONS

International Search Report from International Application No. PCT/JP2014/072113 dated Dec. 2, 2014.
(Continued)

*Primary Examiner* — Viet Le
(74) *Attorney, Agent, or Firm* — Brundidge & Stanger, P.C.

(57) ABSTRACT

A dripper (120) comprises a dripper main body (121) and a movable unit (122). The moveable unit (122) forms the ceiling of a pressure reducing flow path (125) that reduces the pressure of a liquid flowing in the dripper (120), and the moveable unit advances and retracts in accordance with the pressure of the fluid in a tube (110). If the pressure is high, the height of the pressure reducing flow path (125) becomes lower and the flow rate of the liquid in the dripper (120) is thereby restricted. As a result, the flow rate of liquid discharged from a through hole (130) in the tube (110) can be maintained at a substantially constant rate regardless of the aforementioned pressure.

4 Claims, 16 Drawing Sheets

(58) Field of Classification Search
USPC .................................. 239/570, 569, 574, 571
See application file for complete search history.

(56) References Cited

U.S. PATENT DOCUMENTS

| | | |
|---|---|---|
| 5,183,208 A | 2/1993 | Cohen |
| 6,027,048 A | 2/2000 | Mehoudar |
| 6,206,305 B1 | 3/2001 | Mehoudar |
| 6,302,338 B1 * | 10/2001 | Cohen .................. A01G 25/023 137/614.2 |
| 7,681,810 B2 * | 3/2010 | Keren .................. A01G 25/023 138/42 |
| 2005/0204624 A1 | 9/2005 | Teruel et al. |
| 2012/0305676 A1 | 12/2012 | Keren |

FOREIGN PATENT DOCUMENTS

| | | |
|---|---|---|
| JP | S57-202227 A | 12/1982 |
| JP | S61-204471 U | 12/1986 |
| JP | H04-211311 A | 8/1992 |
| JP | 2001-519174 A | 10/2001 |
| JP | 2005-525806 A | 9/2005 |
| JP | 2010-046094 A | 3/2010 |
| WO | 2011/101842 A2 | 8/2011 |

OTHER PUBLICATIONS

Extended European Search Report for EP14839022.2 dated Mar. 8, 2017.

* cited by examiner

DRIPPER AND DRIP IRRIGATION TUBE

TECHNICAL FIELD

The present invention relates to a dripper and a drip irrigation tube including the dripper.

BACKGROUND ART

Drip irrigation methods are known as one of plant cultivating methods. In the drip irrigation methods, a drip irrigation tube is disposed on the soil, and irrigation liquid such as water and liquid fertilizer is slowly supplied from the drip irrigation tube into the soil on which plants are planted, for example. The drip irrigation methods can minimize the liquid consumption, and therefore have increasingly attracted attention in recent years.

Such a drip irrigation tube typically has a tube and a dripper. Typically, the dripper supplies the irrigation liquid in the tube space to the soil at a set rate at which the irrigation liquid drips into the soil. Known examples of the dripper include a dripper which is disposed in such a manner as to stick into a tube from outside, and a dripper which is bonded on an inner wall of a tube.

The latter dripper has, for example, a channel including a pressure reduction channel that allows liquid, which has flowed from the tube space to the dripper, to flow toward a through hole of the tube while depressurizing the liquid; and a diaphragm that changes the volume of a part where the depressurized irrigation liquid flows in accordance with the liquid pressure in the tube space. The dripper is composed of three members, i.e., a member bonded to the inner wall of the tube, a member disposed on the member bonded to the inner wall of the tube, and the diaphragm disposed between the two members. The diaphragm is formed of an elastic film such as a silicone rubber film (see, e.g., PTL 1).

The drippers can suppress variations in the ejection amount of the irrigation liquid regardless of changes in liquid pressure in the tube space. Therefore, the dripper is advantageous from the perspective of growing multiple plants uniformly.

CITATION LIST

Patent Literature

PTL 1
Japanese Patent Application Laid-Open No. 2010-46094

SUMMARY OF INVENTION

Technical Problem

The drippers are formed by assembling the three members, and thus an assembly error may occur in the drippers. In particular, the assembly error in the diaphragms may cause variations in operation of the diaphragms, and variations in the ejection amount of irrigation liquid.

Further, while the dripper is typically formed of an inexpensive resin such as polyethylene and polypropylene, the diaphragm is made of a more expensive elastic material member such as a silicone rubber film. Use of such different materials has a room for improvement in terms of reduction of a material cost.

In some situation, several hundreds of drippers are disposed in one drip irrigation tube, and in that case pressure drop of the irrigation liquid is large when the drippers bonded on the inner wall of the tube are large. For this reason, in the case where a long drip irrigation tube is used, the pressure for supplying liquid to the tube is required to be high, and as a result the liquid ejection amount of the drippers may be unstabilized. Therefore, it is desired to reduce the size of the drippers from the perspective of suppressing the pressure drop of the liquid in the tube.

Further, a dripper which can be produced with a single inexpensive material and a smaller number of components is desired from the perspective of suppressing the material cost and the production cost of the dripper.

An object of the present invention is to provide a dripper capable of stabilizing the ejection amount of irrigation liquid and reducing production cost, and a drip irrigation tube having the dripper.

Solution to Problem

A dripper according to the present invention is configured to form a channel by bonding to an inner wall of a tube at a position where the dripper covers a through hole formed on a wall of the tube, the channel allowing a space in the tube and the through hole to communicate with each other and including a pressure reduction channel that allows liquid flowing into the dripper from the space to flow toward the through hole while depressurizing the liquid, the dripper including: a dripper body configured to form the channel by bonding to the inner wall of the tube, the channel including an open part which opens to the space; and a movable part for changing a cross-sectional area of the channel at the opening in accordance with a pressure of the liquid in the space, the movable part disposed to cover the open part from a space side such that the movable part is movable forward or backward in the open part in accordance with the pressure of the liquid in the space.

A drip irrigation tube according to the present invention has a tube and the dripper.

Advantageous Effects of Invention

A dripper according to the present invention can be formed with only two members, i.e., a dripper body, and a movable part configured to move when receiving liquid pressure in the tube. The dripper according to the present invention can also, by virtue of the movable part, suppress changes in the ejection amount of the liquid caused by changes in the liquid pressure in the tube. The dripper according to the present invention does not need a diaphragm disposed between two members to suppress the changes in the ejection amount of the liquid, so that the dripper can be smaller (thinner) than a dripper with a diaphragm. Therefore, the dripper according to the present invention is advantageous for suppressing increase in pressure drop of liquid in the tube, and ejecting irrigation liquid at a stable ejection amount. Further, the dripper according to the present invention can reduce production cost in comparison with a dripper composed of three members.

DESCRIPTION OF EMBODIMENTS

Hereinafter, embodiments of the present invention will be described in detail with reference to the accompanying drawings.

Embodiment 1

Figure 1A:
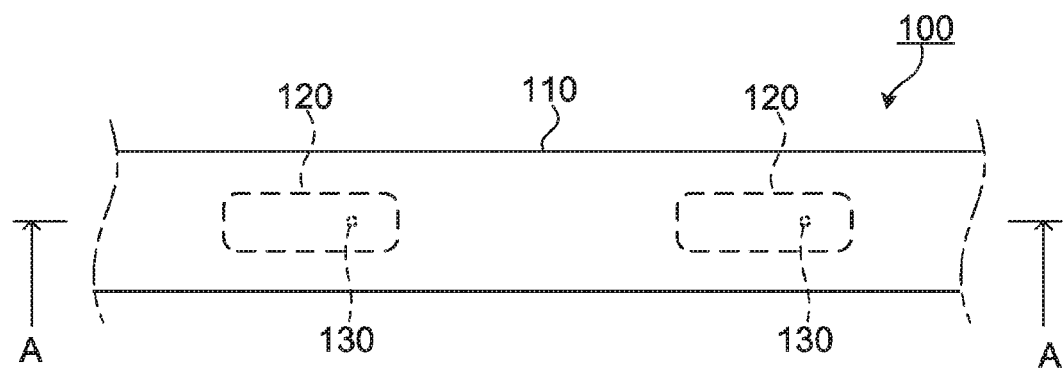
FIG. 1A is a schematic plan view of a drip irrigation tube according to Embodiment 1 of the present invention.
Figure 1B:
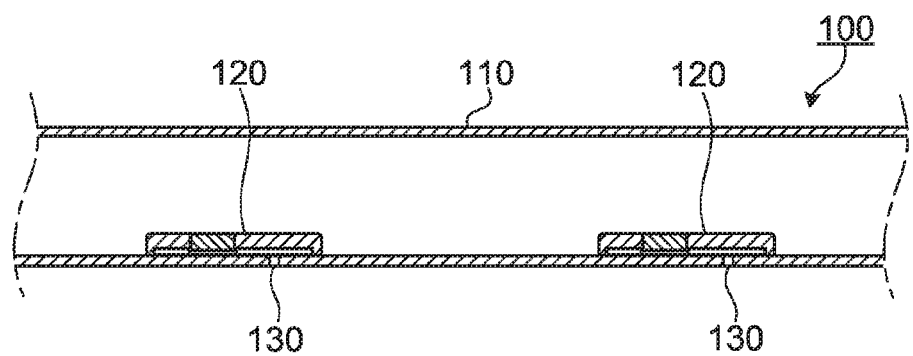
FIG. 1B is a cross-sectional view of the drip irrigation tube cut along line A-A in FIG. 1A.

FIG. 1A is a schematic plan view of a drip irrigation tube according to Embodiment 1 of the present invention, and FIG. 1B is a cross-sectional view of the drip irrigation tube cut along line A-A in FIG. 1A.

Drip irrigation tube 100 is composed of tube 110 and drippers 120. Tube 110 is made of, e.g., polyethylene, and dripper 120 is made of, e.g., polypropylene. Drippers 120 are disposed at a predetermined interval (e.g., 200 to 500 mm) in the axis direction of tube 110. Each dripper 120 is fixed on the inner wall of tube 110 by welding. Dripper 120 is disposed at a position where dripper 120 covers through hole 130 of tube 110. Specifically, dripper 120 is disposed such that an ejection part thereof described below covers through hole 130. The hole diameter of through hole 130 is, for example, 1.5 mm. Through hole 130 is typically formed after dripper 120 is welded.

Figure 2:
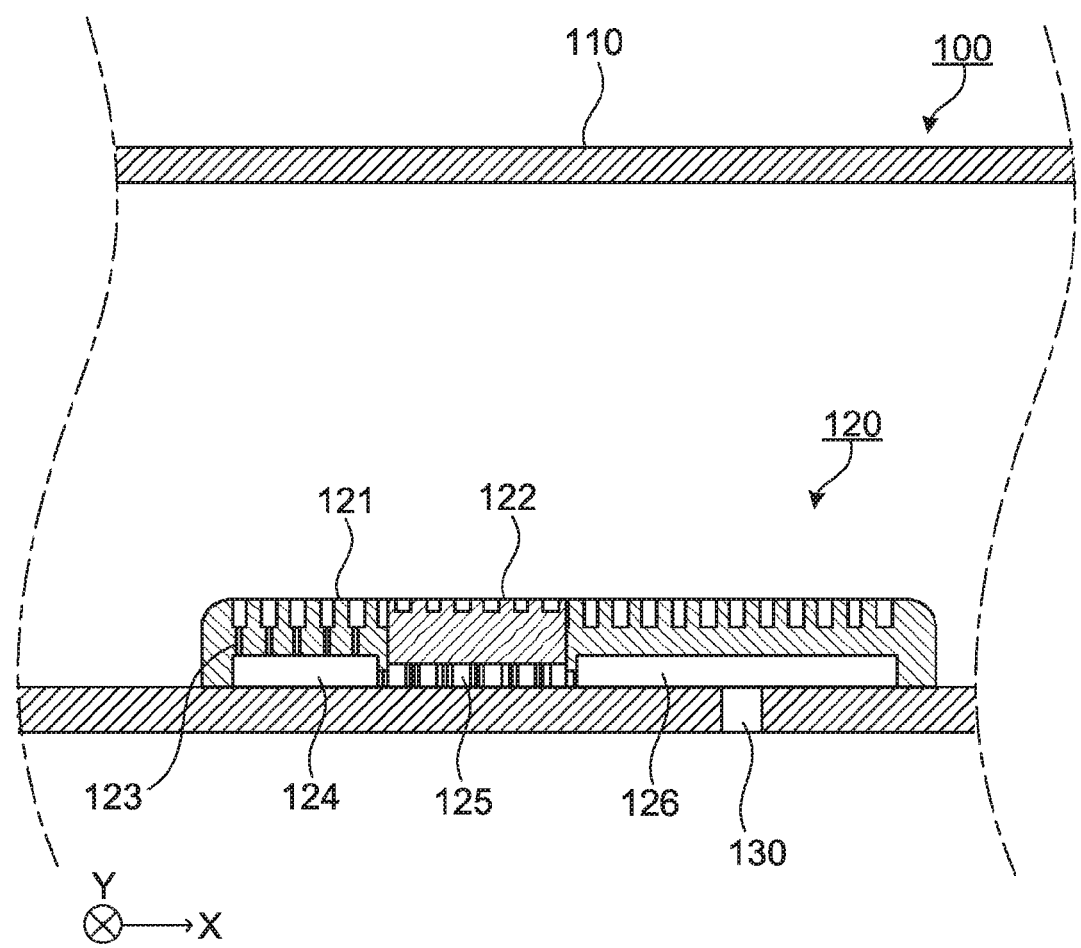
FIG. 2 illustrates an enlarged cross-section of a dripper in the drip irrigation tube according to Embodiment 1.
Figure 3A:
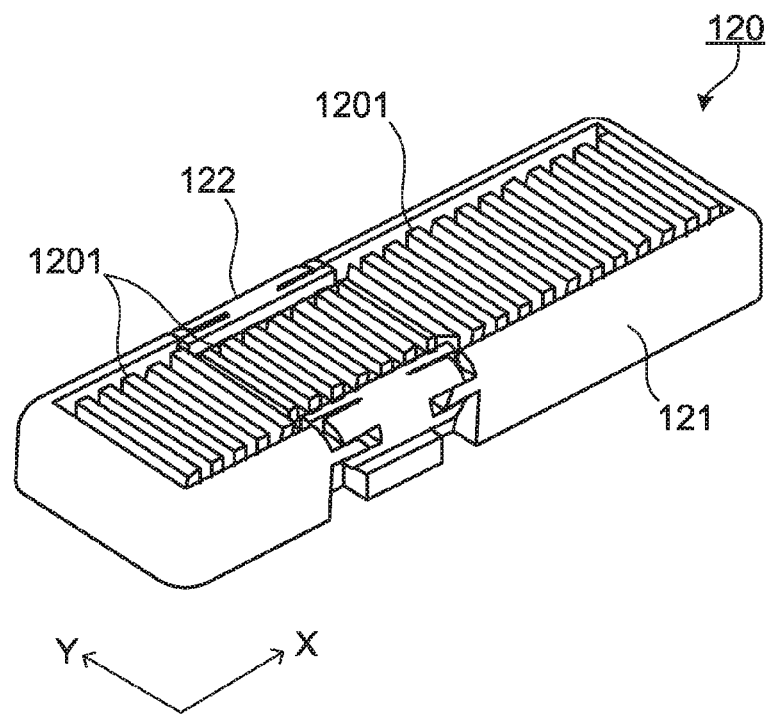
FIG. 3A illustrates an upper surface, a front surface, and a side surface of the dripper according to Embodiment 1.
Figure 3B:
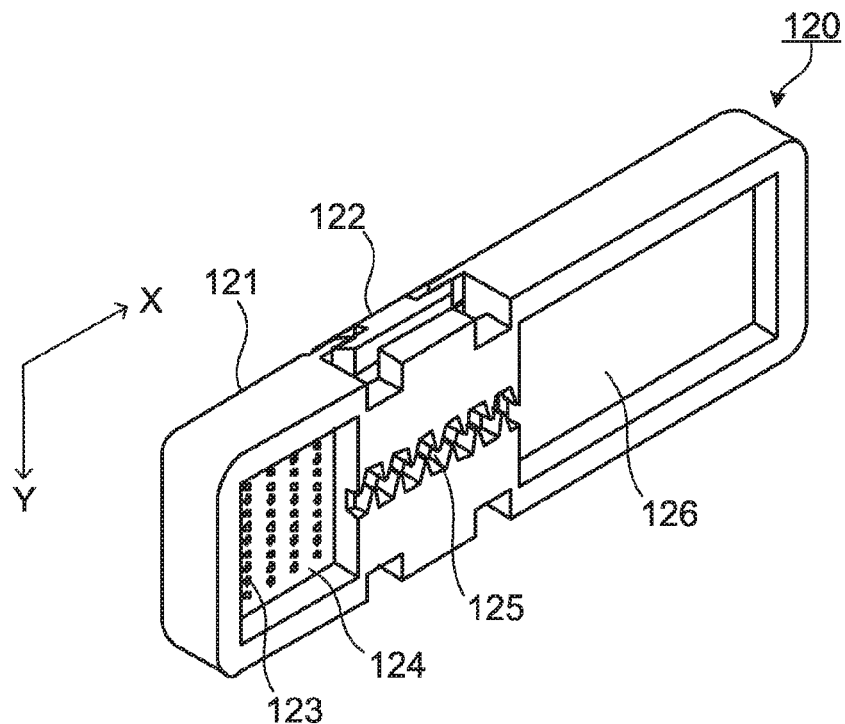
FIG. 3B illustrates a bottom surface, the front surface and the side surface of the dripper.

FIG. 2 illustrates an enlarged cross-section of the dripper in the drip irrigation tube according to the present embodiment. FIG. 3A illustrates an upper surface, a front surface, and a side surface of the dripper according to the present embodiment, and FIG. 3B illustrates a bottom surface, the front surface and the side surface of the dripper. FIG. 4A to FIG. 4D are a plan view, a front view, a bottom view and a side view of the dripper according to the present embodiment, respectively.

Dripper 120 has dripper body 121 and movable part 122 engaged with dripper body 121, as shown in FIG. 2. Dripper 120 forms a liquid channel which is independent from the inner space of tube 110 and allows the inner space of tube 110 to communicate with through hole 130. The channel includes inflow part 124, pressure reduction channel 125 and ejection part 126. Inflow part 124 communicates with the inner space of tube 110 through inflow ports 123. Pressure reduction channel 125 is formed by fitting a projection of movable part 122 described below with an open part of dripper body 120 described below.

Figure 4A:
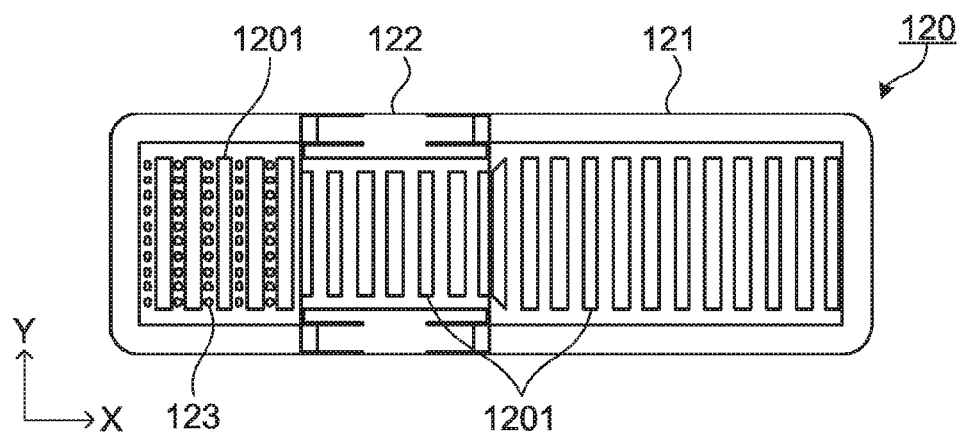
FIG. 4A to FIG. 4D are a plan view, a front view, a bottom view and a side view of the dripper according to Embodiment 1, respectively.

A depression (also referred to as "top surface side recess") is formed on the upper surface (top surface) of dripper 120, and a plurality of protrusions 1201 are disposed in the top surface side recess, as shown in FIGS. 3A and 4A. Protrusions 1201 extend in transverse direction Y of dripper 120 and are arranged in parallel in longitudinal direction X of dripper 120. Both ends of protrusion 1201 are apart from side walls of the top surface side recess in Y direction. The height of protrusion 1201 is, for example, 0.5 mm, and the interval between protrusions 1201 (the distance between the axes of protrusions 1201) is, for example, 0.5 mm.

Figure 4B:
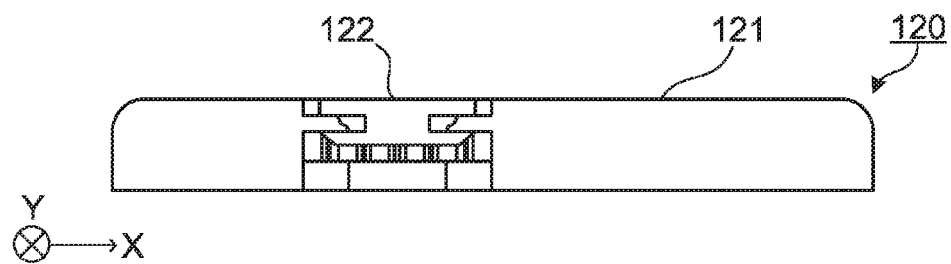
Figure 4C:
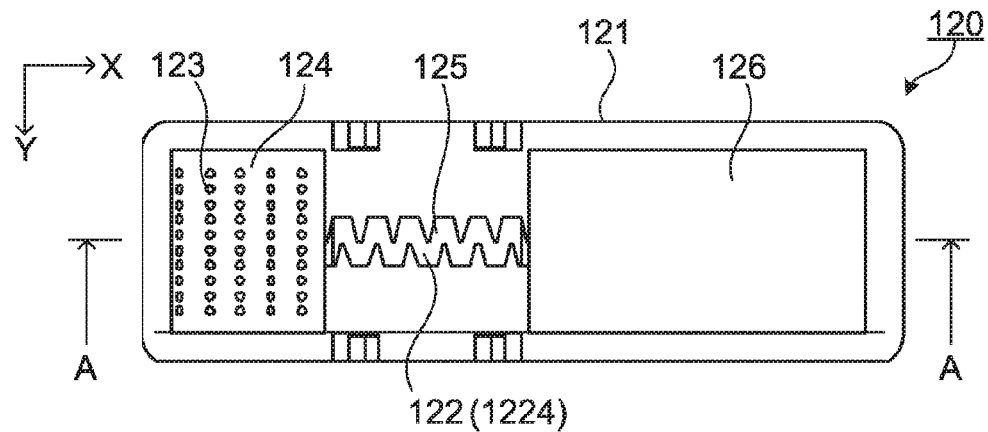
Figure 4D:
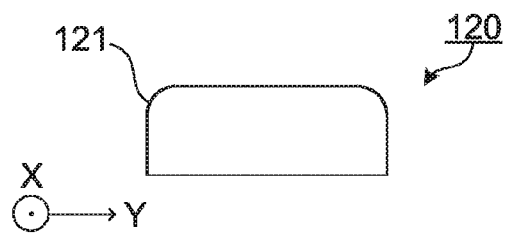

A plurality of inflow ports 123 are disposed on the bottom of the top surface side recess at one end part in X direction, as shown in FIGS. 3B and 4C. Inflow ports 123 are disposed in lines along protrusions 1201 (in Y direction). Inflow port 123 is a hole extending through the bottom of the top surface side recess and allows the upper side of dripper 120 to communicate with inflow part 124. The hole diameter of inflow port 123 is, for example, 0.3 mm.

As shown in FIGS. 3B and 4C, each of inflow part 124 and ejection part 126 is a rectangular depression (also referred to as "bottom surface side recesses") which is recessed from the bottom surface of dripper body 121 and is disposed at each end part of dripper body 121. The height of inflow part 124 (the depth of the bottom surface side recess at one end side in X direction) is, for example, 1.0 mm, and the height of ejection part 126 (the depth of the bottom surface side recess at the other end side) is, for example, 1.0 mm.

Pressure reduction channel 125 allows inflow part 124 to communicate with ejection part 126, as shown in FIG. 4C. The shape of pressure reduction channel 125 in plan view is a zigzag shape. The zigzag shape is formed by alternately disposing protrusions each having a substantially triangular prism shape and protruding from side walls of pressure reduction channel 125 in the longitudinal direction of pressure reduction channel 125. The protrusion is formed such that the tip end of the protrusion does not go beyond the central axis of pressure reduction channel 125 in plan view. Both end parts of pressure reduction channel 125 are formed only with dripper body 121, and the other part of pressure reduction channel 125 is formed by fitting a projection of movable part 122 together with an open part formed in dripper body 121 (FIGS. 4B and 4C).

FIG. 5A to FIG. 5D are a plan view, a front view, a bottom view and a side view of the dripper body according to the present embodiment, respectively.

Figure 5A:
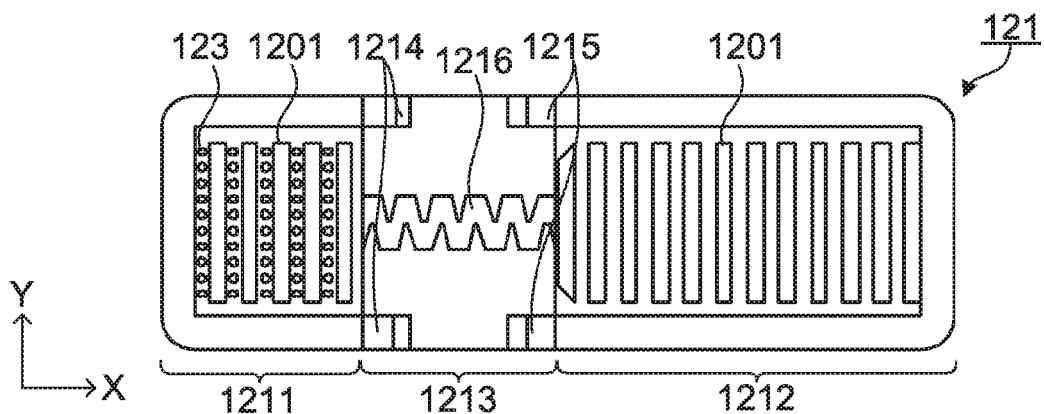
FIG. 5A to FIG. 5D are a plan view, a front view, a bottom view and a side view of a dripper body according to Embodiment 1, respectively.
Figure 5B:
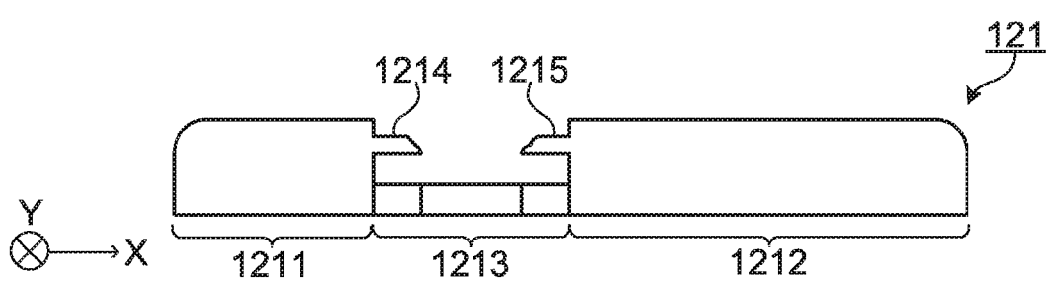
Figure 5C:
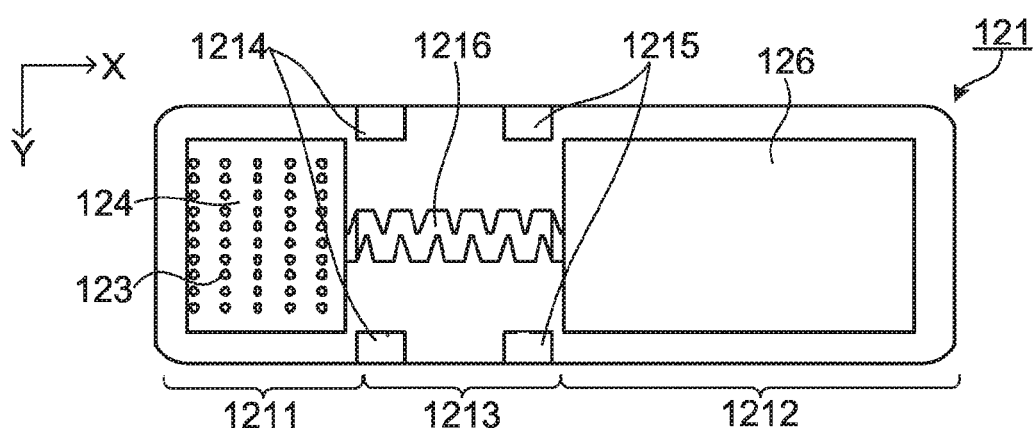
Figure 5D:
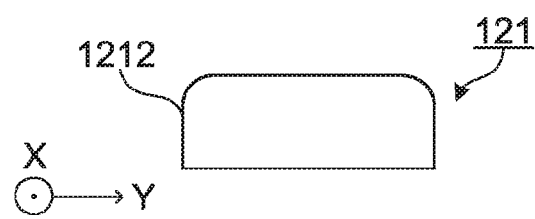

Dripper body 121 is made of, e.g., polypropylene. Dripper body 121 has first end part 1211, second end part 1212 and connecting part 1213 as shown in FIGS. 5A to 5C. First end part 1211 includes the top surface side recess, protrusions 1201, inflow ports 123 and inflow part 124. Second end part 1212 includes the top surface side recess, protrusions 1201 and ejection part 126.

Further, first end part 1211 and second end part 1212 have elastic supporters 1214 and 1215, respectively, at both end parts of first end part 1211 and second end part 1212. Both elastic supporters 1214 and 1215 are disposed at relatively high positions on upper surface (top surface) side relative to the center of dripper body 121 in the height (thickness) direction. Elastic supporter 1214 is a plate-shaped elastic member protruding from an end surface of first end part 1211 on second end part 1212 side. Elastic supporter 1215 is a plate-shaped elastic member protruding from an end surface of second end part 1212 on first end part 1211 side. The upper surface (top surface) of each of elastic supporters 1214 and 1215 is parallel with the top surface of dripper body 121. An inclining surface inclined from top surface side to the bottom surface side is formed at the tip of the upper surface (top surface) of each of elastic supporters 1214 and 1215.

Connecting part 1213 connects first end part 1211 with second end part 1212. The shape of connecting part 1213 in plan view is a substantially cross shape formed by cutting out a rectangle having a shape substantially the same as the shape of elastic supporters 1214 and 1215 in plan view from every corner of a rectangle, as shown in FIGS. 5A and 5C. Connecting part 1213 has a bottom surface on the same plane as the bottom surfaces of first end part 1211 and second end part 1212, as shown in FIG. 5B. The thickness (height) of connecting part 1213 is less than half the height of dripper body 121, and slightly larger than the height of pressure reduction channel 125. The height of connecting part 1213 is, for example, about 1.3 times as large as the height of pressure reduction channel 125.

Connecting part 1213 includes open part 1216 which opens to the inner space of tube 110 except for both end parts of pressure reduction channel 125. The shape of open part 1216 in plan view is the same as the zigzag shape of pressure reduction channel 125, as shown in FIGS. 5A and 5C. Open part 1216 is configured of a cut extending through connecting part 1213 in the thickness direction of connecting part 1213.

FIG. 6A to FIG. 6D are a plan view, a front view, a bottom view and a side view of a movable part according to the present embodiment, respectively.

Movable part 122 is made of, e.g., polypropylene. Movable part 122 has pressure receiving part 1221, spacer 1222, engaging part 1223 and projection 1224, as shown in FIGS. 6A to 6D. Pressure receiving part 1221 forms the top surface of movable part 122. Pressure receiving part 1221 includes the depression, and protrusions 1201. The shape of pressure receiving part 1221 is substantially rectangular, but every corner is slightly cut out by a rectangle. The length of the cutout in X direction is several millimeters, and the length of the cutout in Y direction is substantially the same as the length of elastic supporter 1215 in Y direction. End parts of pressure receiving part 1221 in Y direction have a linear cut formed in X direction from each cutout.

Spacer 1222 is disposed on the bottom surface side of pressure receiving part 1221. The shape of spacer 1222 in plan view is rectangular. The length of spacer 1222 in X direction is less than the distance between the tip ends of elastic supporters 1214 and 1215 of dripper body 121, and the length of spacer 1222 in Y direction is substantially the same as the length of pressure receiving part 1221 in Y direction. The thickness of spacer 1222 is substantially the same as the thickness of elastic supporters 1214 and 1215. Spacer 1222 is disposed at a center of movable part 122 in X direction where spacer 1222 does not touch the tip end of elastic supporter 1214 or elastic supporter 1215.

Engaging part 1223 is connected to the bottom surface side of spacer 1222. The shape of engaging part 1223 in plan view is rectangular. An inclining surface inclined from bottom surface side to the top surface side is formed at both ends of the bottom surface of engaging part 1223 in X direction. The length of engaging part 1223 in X direction is substantially the same as the length of the remaining part of pressure receiving part 1221 in X direction after the cutout at the both end parts. The length of engaging part 1223 in Y direction is substantially the same as the length of pressure receiving part 1221 in Y direction.

Figure 6A:
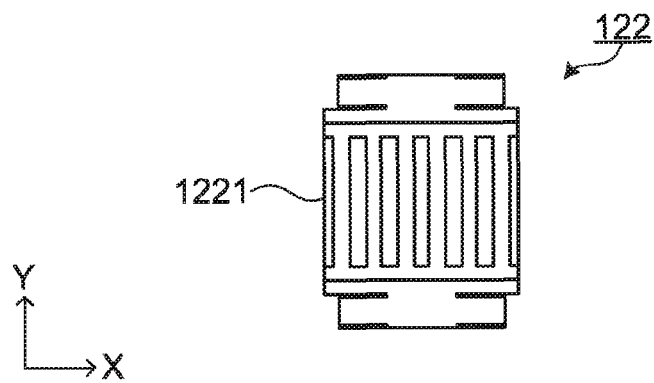
FIG. 6A to FIG. 6D are a plan view, a front view, a bottom view and a side view of a movable part according to Embodiment 1, respectively.
Figure 6B:
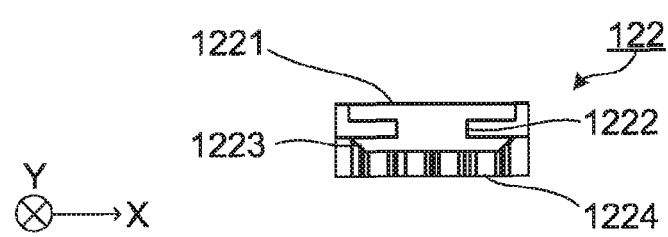
Figure 6C:
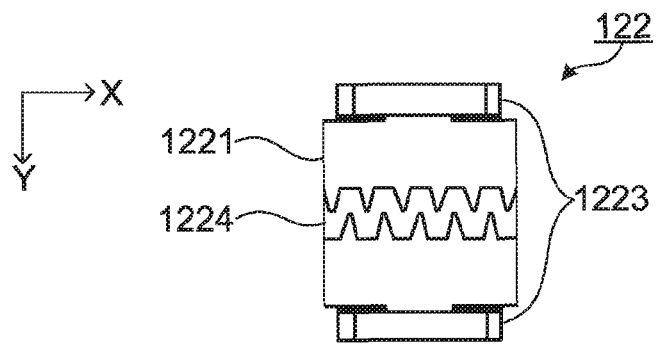
Figure 6D:
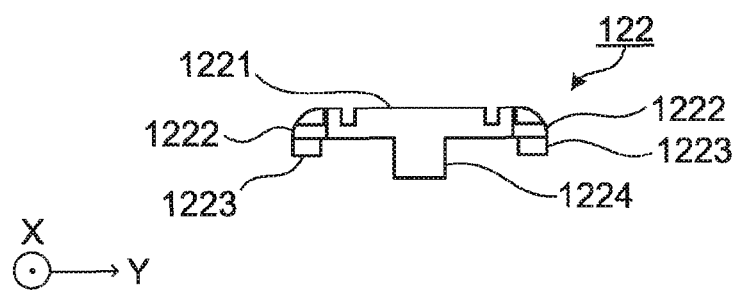

Projection 1224 is a part connected to the bottom surface side of engaging part 1223 as shown in FIGS. 6B and 6D. The shape of projection 1224 in plan view is the same as the shape of open part 1216 of dripper body 121 in plan view as shown in FIG. 6C. The protruding height of projection 1224 is the sum of a movable distance of movable part 122 and an additional distance a. The movable distance is a distance from the bottom surface of spacer 1222 to the top surface of connecting part 1213 of dripper body 121, and is 0.5 mm for example. The distance a is a distance for slightly fitting the top part of projection 1224 with open part 1216 for the positioning of projection 1224, and is about 0.25 mm for example.

Dripper 120 is assembled by disposing movable part 122 on connecting part 1213 and by pushing movable part 122 into connecting part 1213. In response to the pushing, elastic supporters 1214 and 1215 are bent, and the inclining surfaces of the tips of engaging part 1223 slide on the inclining surfaces of the tips of elastic supporters 1214 and 1215, and thus, elastic supporters 1214 and 1215 are fit in the gap between pressure receiving part 1221 and engaging part 1223. As a result, elastic supporters 1214 and 1215 support pressure receiving part 1221, and engage with engaging part 1223. Movable part 122 is thus supported in dripper body 121 with the elasticity of elastic supporters 1214 and 1215 in a movable manner Projection 1224 of movable part 122 covers open part 1216 from above and is slightly fit with open part 1216 of dripper body 121. With this fitting, pressure reduction channel 125 is formed.

Figure 7A:
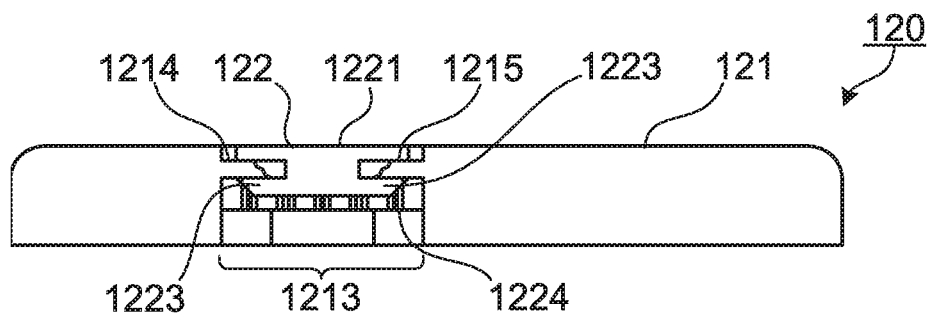
FIG. 7A is a side view schematically illustrating a state before the movement of the movable part of the dripper according to Embodiment 1.
Figure 7B:
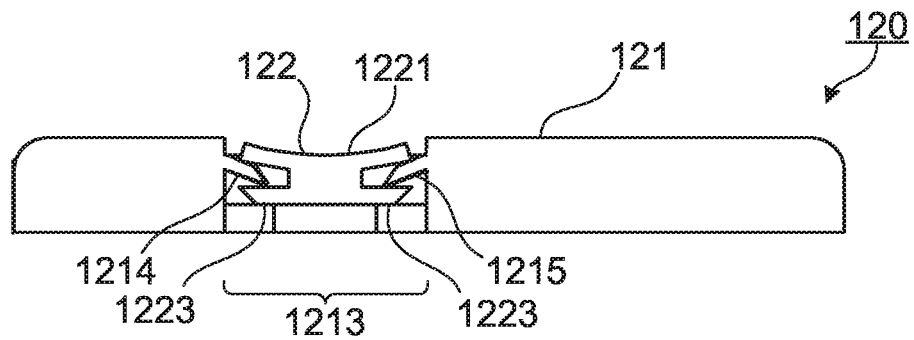
FIG. 7B is a side view schematically illustrating a state after the movement of the movable part of the dripper.
Figure 8A:
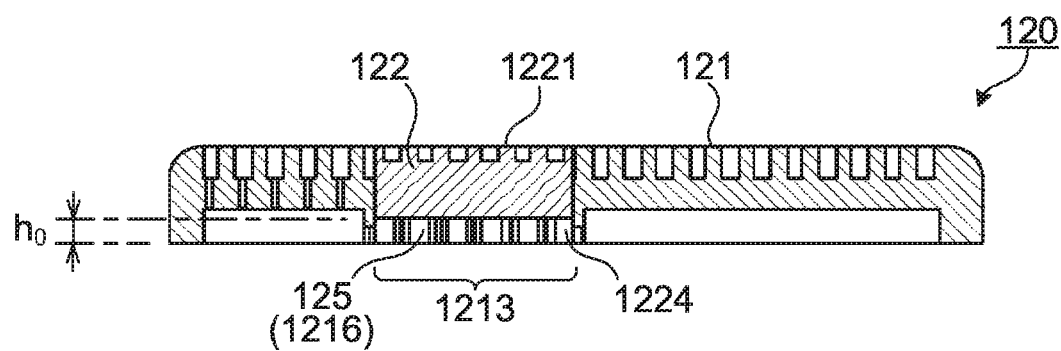
FIG. 8A is a cross-sectional view schematically illustrating the dripper according to Embodiment 1 cut along line A-A in FIG. 4C before the movement of the movable part.

FIG. 7A is a side view schematically illustrating a state before the movement of the movable part of the dripper according to the present embodiment, and FIG. 7B is a side view schematically illustrating a state after the movement of the movable part of the dripper. FIG. 8A is a cross-sectional view schematically illustrating the dripper according to the present embodiment cut along line A-A in FIG. 4C before the movement of the movable part, and FIG. 8B is a cross-sectional view schematically illustrating the dripper cut along line A-A in FIG. 4C after the movement of the movable part.

When a sufficient pressure is not exerted on pressure receiving part 1221, movable part 122 does not move as shown in FIGS. 7A and 8A. In this case, height $h_0$ of pressure reduction channel 125 (the distance from the bottom surface of connecting part 1213 to the head of protrusion 1224) is 0.75 mm for example. The cross-sectional area of pressure reduction channel 125 has a maximum value in this case.

Figure 8B:
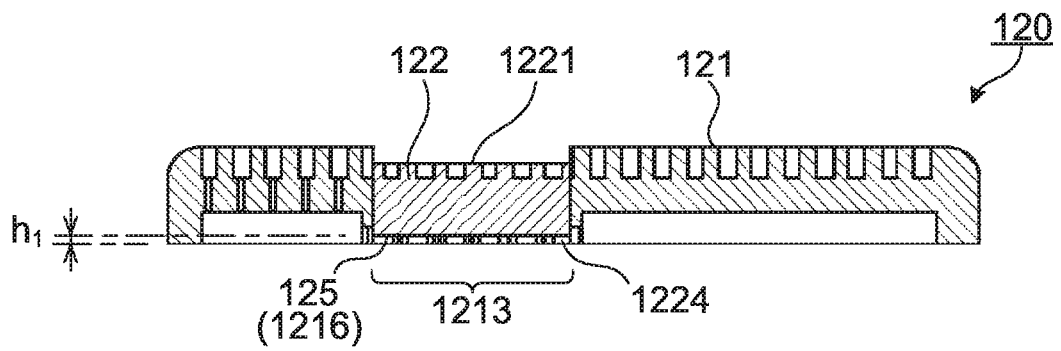
FIG. 8B is a cross-sectional view schematically illustrating the dripper cut along line A-A in FIG. 4C after the movement of the movable part.

When a sufficient pressure is exerted on pressure receiving part 1221, movable part 122 is biased to the bottom surface side of dripper 120 and elastic supporters 1214 and 1215 supporting movable part 122 are bent as shown in FIGS. 7B and 8B. Movable part 122 thus moves toward the bottom surface side to allow projection 1224 to slide further into open part 1216. Height $h_1$ of pressure reduction channel 125 in this case is smaller than $h_0$ and 0.25 mm for example.

When the pressure on pressure receiving part 1221 is released, movable part 122 slides on open part 1216 upward with the elasticity of elastic supporters 1214 and 1215, and the height of pressure reduction channel 125 increases. In this case, the height of pressure reduction channel 125 is $h_0$. Thus, movable part 122 slides forward or backward on open part 1216 in accordance with the pressure on pressure receiving part 1221, and the height (cross-sectional area) of pressure reduction channel 125 changes.

The operation of dripper 120 in drip irrigation tube 100 will be described.

Liquid is supplied in drip irrigation tube 100 in FIG. 2. The liquid flows in X direction. The liquid fills gaps between protrusions 1201. Protrusions 1201 are arranged in parallel in the longitudinal direction (direction X) on the top surface of dripper 120, and gaps are formed between the both ends of protrusions 1201 in Y direction and side walls of the top surface side recess. With this configuration, the gaps between protrusions 1201 are not completely blocked even when a floating object such as a fallen leaf in the liquid sticks to the top surface of dripper 120. Thus, the gaps to which inflow ports 123 open between protrusions 1201 are filled with liquid at all times. In this manner, protrusions 1201 provide a function as a filter.

Inflow ports 123 are through holes formed in dripper body 121 made of polypropylene; therefore, inflow ports 123 has water repellency specific to polypropylene. When liquid pressure is at a specific value (e.g., 0.005 MPa, which is also referred to as "burst pressure") or higher, the liquid filling the gaps overcomes the liquid surface tension of the water repellency, and flows into inflow part 124 from inflow ports 123. In this manner, inflow ports 123 provides a low-pressure stopping function to inhibit the inflow of liquid whose pressure is lower than a specific value. The low-pressure stopping function can be adjusted by the hole diameter, pitch, number, open part shape, length (thickness of the bottom of the top surface side recess) of inflow ports 123, and the like.

Liquid having a pressure higher than the burst pressure flows into inflow part 124, and then flows through pressure reduction channel 125. The liquid flowing through pressure reduction channel 125 is depressurized by pressure drop which is caused by the shape of pressure reduction channel 125 in plan view (zigzag shape). The depressurized liquid is received in ejection part 126. The liquid received in ejection part 126 is ejected from through hole 130. The liquid ejected from through hole 130 drips from drip irrigation tube 100 into the soil, for example.

When the liquid pressure in drip irrigation tube 100 is in a range from the burst pressure to a specific pressure higher than the burst pressure (e.g., 0.05 MPa, which is also referred to as "movement starting pressure"), movable part 122 does not move. This is because the elasticity of elastic supporters 1214 and 1215 overcome the liquid pressure on pressure receiving part 1221. During this time, the liquid ejection rate from through hole 130 is substantially constant at a set rate.

When the liquid pressure in drip irrigation tube 100 is equal to or higher than the movement starting pressure, the pressure on pressure receiving part 1221 overcomes the elasticity of elastic supporters 1214 and 1215, and movable part 122 moves in accordance with the pressure toward the bottom surface side of dripper 120 in a range of less than 0.5 mm. As a result, the height of pressure reduction channel 125 becomes, e.g., 0.5 mm, and the amount of liquid flowing through pressure reduction channel 125 is limited. In this manner, the increase of a liquid flow rate due to the pressure increase is offset by the decrease of the liquid flow rate caused by reduction of the cross-sectional area of pressure reduction channel 125, and thus a supply rate of the liquid to ejection part 126 is maintained at a substantially constant rate. Consequently, the ejection rate of the liquid from through hole 130 is substantially maintained at the above-mentioned set rate.

When the liquid pressure in drip irrigation tube 100 is equal to or higher than a specific pressure which is larger than the movement starting pressure (e.g., 0.1 MPa, which is also referred to as "maximum movement pressure"), movable part 122 is further biased by the liquid pressure. As a result, the height of pressure reduction channel 125 minimized (to the above-described $h_1$, e.g., 0.25 mm), and the amount of the liquid flowing through pressure reduction channel 125 is further limited. In this manner, the increase of a liquid flow rate due to the further pressure increase is offset by the decrease of the liquid flow rate caused by the further reduction of the cross-sectional area of pressure reduction channel 125 and thus the supply rate of the liquid to ejection part 126 is still maintained at a substantially constant rate. Consequently, the ejection rate of the liquid from through hole 130 is substantially maintained at the above-mentioned set rate.

Dripper 120 according to the present embodiment includes, as described above, dripper body 121 forming a channel having a part of pressure reduction channel 125 (open part 1216) opened to the inner space of tube 110, and movable part 122 disposed to cover open part 1216 from the space side and be movable forward or backward in open part 1216 in accordance with the liquid pressure in drip irrigation tube 100. Thus, dripper 120 can suppress changes in the ejection amount due to the increase of the pressure of liquid flowing into dripper 120. Therefore, dripper 120 can eject liquid at a constant flow rate regardless of the change in the pressure.

Further, dripper 120 can be composed with only two members, i.e., dripper body 121 and movable part 122; therefore, the size (thickness) of dripper 120 can be further reduced in comparison with conventional drippers composed of three members and having a diaphragm.

Since the size of drippers 120 can be further reduced, drippers 120 can further suppress an increase of liquid pressure drop in tube 110 in comparison with the conventional drippers. As a result, the liquid in drip irrigation tube 100 can be conveyed farther with a low pressure. Therefore, the present embodiment can provide an effect of ejecting liquid at a stable amount even when longer drip irrigation tube 100 is used.

Dripper 120 can further reduce material cost and production cost (assembling cost) in comparison with the conventional drippers.

Dripper body 121 further including inflow ports 123 having a low-pressure stopping function is more effective from the perspective of further suppressing the pressure of the liquid flowing into dripper 120 from the inside of drip irrigation tube 100 for the purpose of efficient use of the liquid.

Dripper 120 does not have a diaphragm in ejection part 126; therefore, no diaphragm would be damaged when forming through hole 130 of drip irrigation tube 100 after welding dripper 120. This means the pressure regulation function of dripper 120 would not be impaired even when through hole 130 is formed after welding dripper 120. The present embodiment thus can produce drip irrigation tube 100 more easily, and further enhance the reliability of drip irrigation tube 100.

Dripper body 121 has inflow part 124 and ejection part 126 connected to each other only with pressure reduction channel 125. This makes it possible to reduce the length of dripper body 121 in X direction. Dripper 120 is thus advantageous also from the perspective of reduction in the size of dripper 120 in X direction.

Embodiment 2

Embodiment 2 is the same as Embodiment 1 except for the structure of the dripper. A dripper according to the present embodiment is different from the dripper of Embodiment 1 in that the dripper further has a communication channel for connecting a pressure reduction channel with an ejection part, and that a movable part changes the cross-sectional area of the communication channel. The configurations same as those of Embodiment 1 are given the same symbols as those of Embodiment 1, and the description thereof is omitted.

Figure 9A:
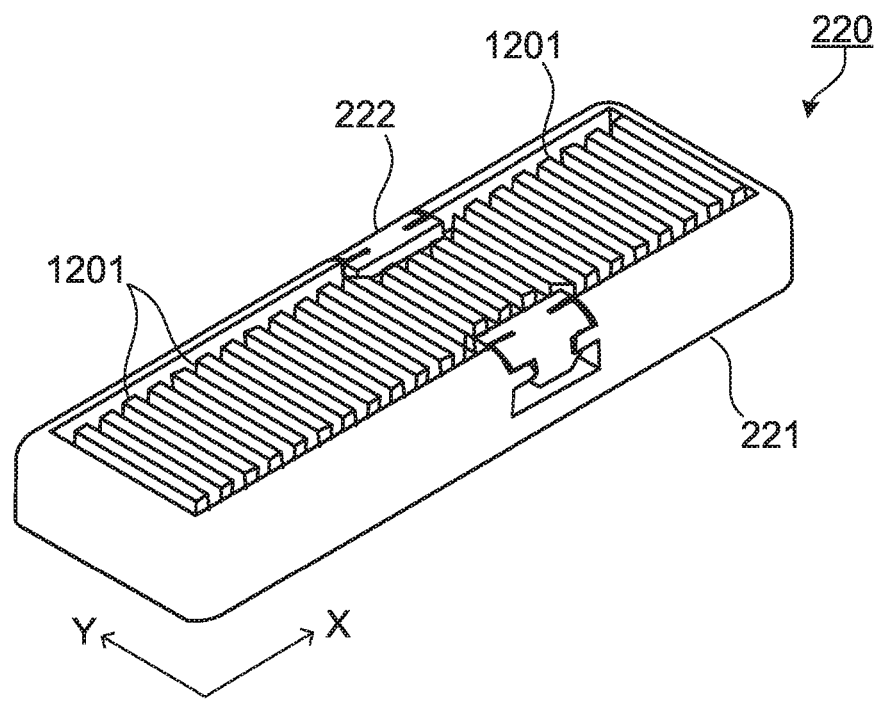
FIG. 9A illustrates an upper surface, a front surface, and a side surface of a dripper according to Embodiment 2.
Figure 9B:
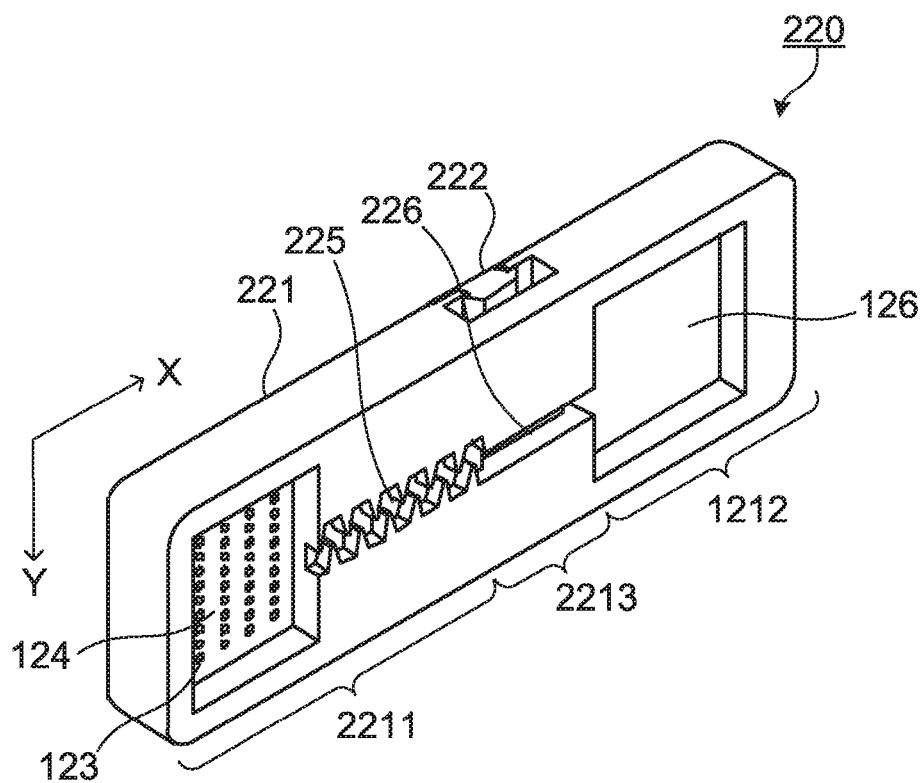
FIG. 9B illustrates a bottom surface, the front surface and the side surface of the dripper.

FIG. 9A illustrates an upper surface, a front surface, and a side surface of the dripper according to the present embodiment, and FIG. 9B illustrates a bottom surface, the front surface and the side surface of the dripper. FIG. 10A to FIG. 10D are a plan view, a front view, a bottom view and a side view of the dripper according to the present embodiment, respectively.

Dripper 220 according to the present embodiment is composed of dripper body 221 and movable part 222. Dripper body 221 has first end part 2211, second end part 2212 and connecting part 2213. First end part 2211 includes inflow ports 123, inflow part 124 and pressure reduction channel 225. Pressure reduction channel 225 is configured with a groove recessed from the bottom surface of dripper body 221. The shape of pressure reduction channel 225 in plan view is the same as that of pressure reduction channel 125.

Connecting part 2213 is formed in the same manner as connecting part 1213 except that connecting part 2213 includes open part 2216, a part of rectangular shaped communication channel 226 in plan view other than the both ends of communication channel 226, which opens to the inner space of tube 110; and that the shape of bottom surface of connecting part 2213 in plan view is rectangular. Open part 2216 is configured of a cut (slit) extending through connecting part 2213 in the thickness direction of connecting part 2213. The shape of open part 2216 in plan view is rectangular. The width of communication channel 226 and open part 2216 (length in Y direction) is, e.g., 0.5 mm.

Figure 10A:
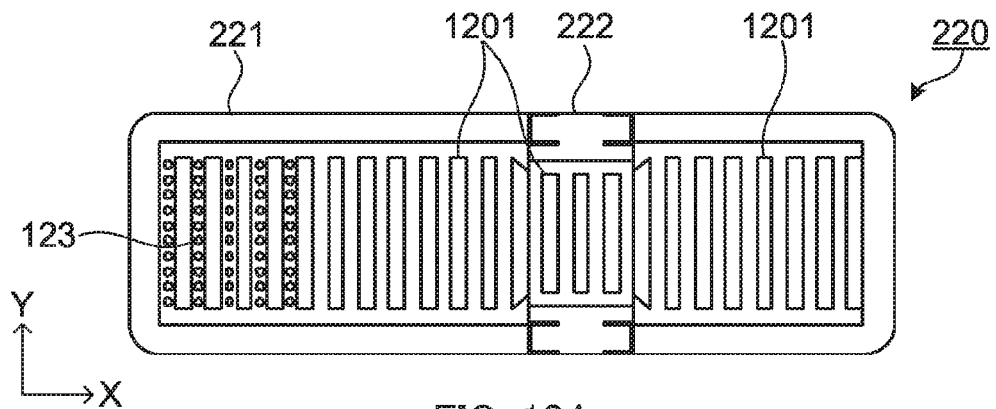
FIG. 10A to FIG. 10D are a plan view, a front view, a bottom view and a side view of the dripper according to Embodiment 2, respectively.
Figure 10B:
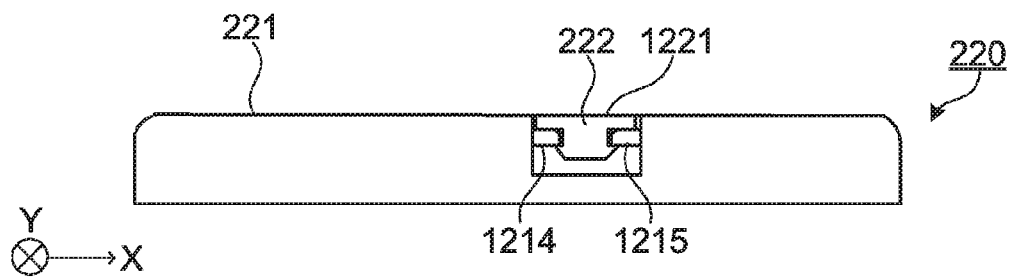
Figure 10C:
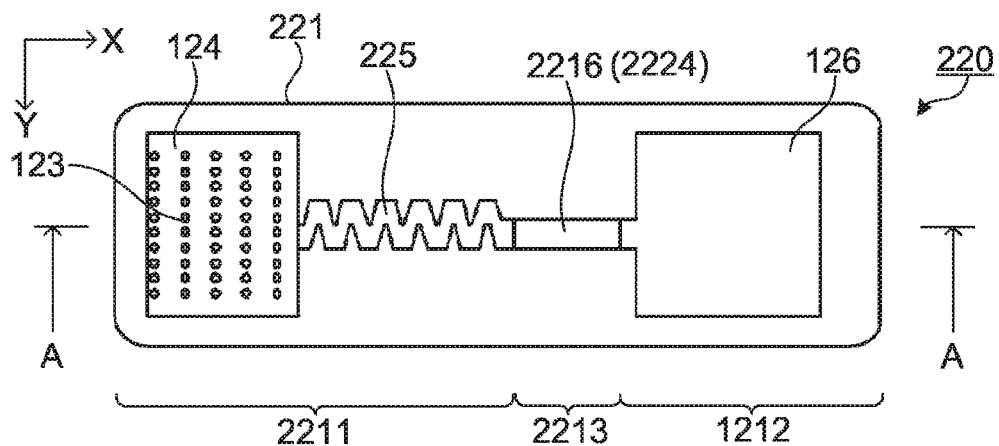
Figure 10D:
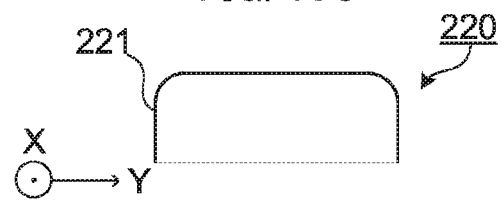

Movable part 222 is formed in the same manner as movable part 122 except for projection 2224. The shape of projection 2224 in plan view is the same as the shape of open part 2216 in plan view, as shown in FIG. 10C. Projection 2224 covers open part 2216 from above and partially fits with open part 2216, and thus communication channel 226 for connecting pressure reduction channel 225 to ejection part 126 is formed.

Figure 11A:
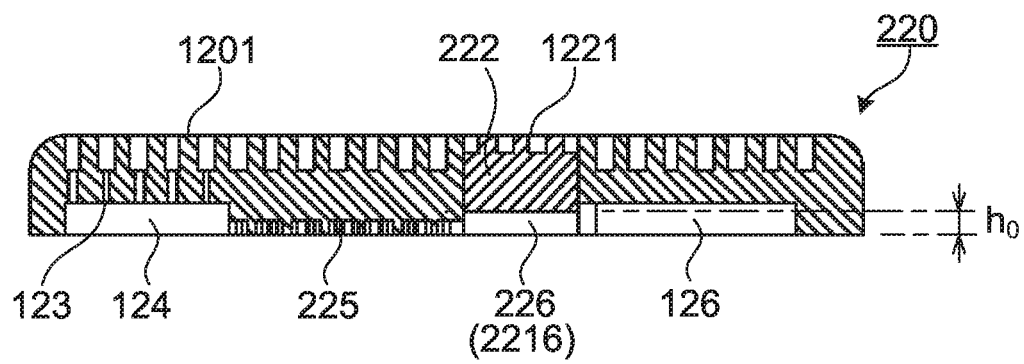
FIG. 11A is a cross-sectional view schematically illustrating the dripper according to Embodiment 2 cut along line A-A in FIG. 10C before the movement of a movable part.
Figure 11B:
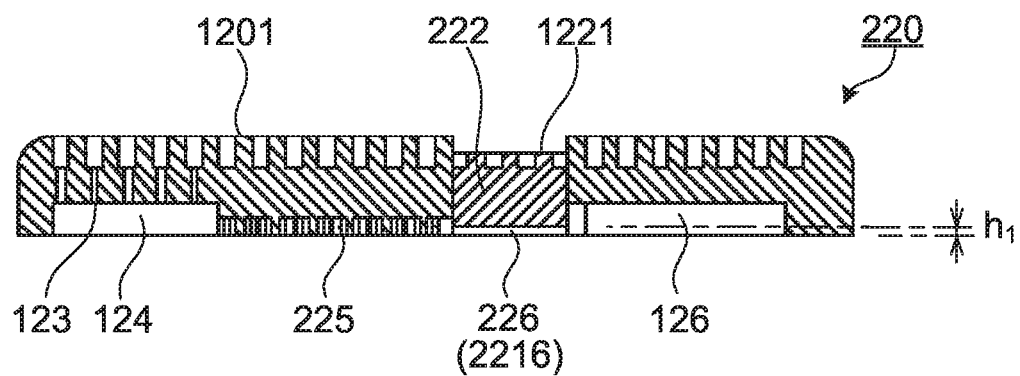
FIG. 11B is a cross-sectional view schematically illustrating the dripper cut along line A-A in FIG. 10C after the movement of the movable part.

FIG. 11A is a cross-sectional view schematically illustrating the dripper according to the present embodiment cut along line A-A in FIG. 10C before the movement of the movable part, and FIG. 11B is a cross-sectional view schematically illustrating the dripper cut along line A-A in FIG. 10C after the movement of the movable part.

In the same manner as movable part 122 in Embodiment 1, movable part 222 slides at open part 2216 forward or backward from the bottom surface side of dripper 220 in a distance in accordance with the pressure on pressure receiving part 1221 to change the height (cross-sectional area) of communication channel 226 in a range of $h_0$ to $h_1$, e.g., from 0.25 to 0.75 mm in accordance with the pressure.

The present embodiment provides the same effects as that of Embodiment 1. Since dripper 220 according to the present embodiment further has a communication channel, dripper 220 can change a cross-sectional area of a part whose shape is simpler than that of the pressure reduction channel in the channel formed with dripper 220. The shape of projection 2224 of movable part 222 in plan view thus can be further simplified. Therefore, the present embodiment is more effective from the perspective of simplifying the production of movable part 222 and assemblage of dripper 220.

Embodiment 3

Embodiment 3 is the same as Embodiment 1 except for a pressure reduction channel. A dripper according to the present embodiment is different from that of Embodiment 1 in that the dripper changes a cross-sectional area of the pressure reduction channel by allowing a movable part to move in the width direction of the pressure reduction channel. The configurations same as those of Embodiment 1 are given the same symbols as those of Embodiment 1, and the description thereof is omitted.

Figure 12A:
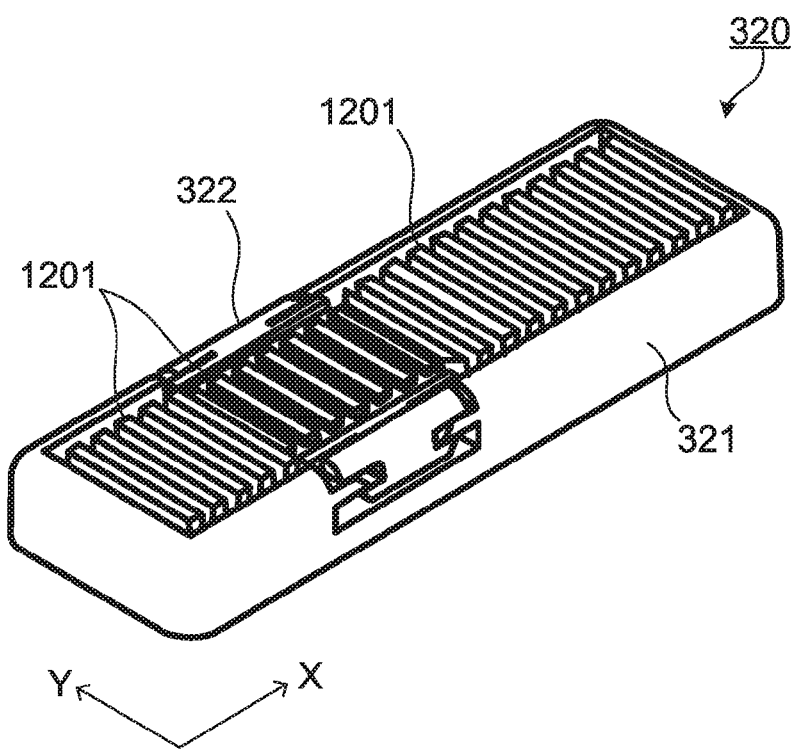
FIG. 12A illustrates an upper surface, a front surface, and a side surface of a dripper according to Embodiment 3.
Figure 12B:
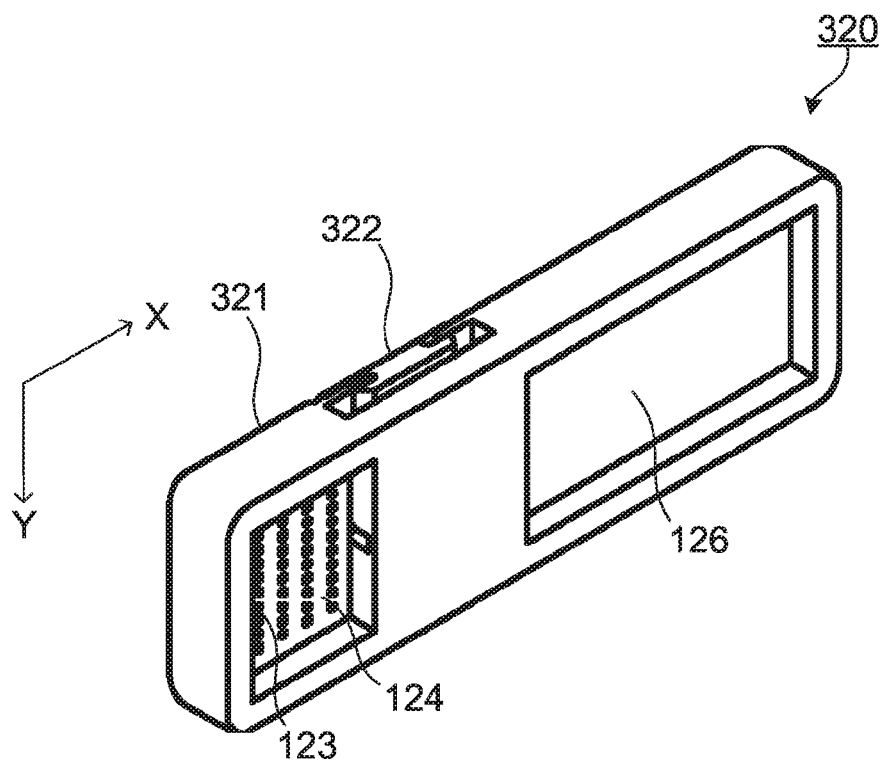
FIG. 12B illustrates a bottom surface, the front surface and the side surface of the dripper.
Figure 13A:
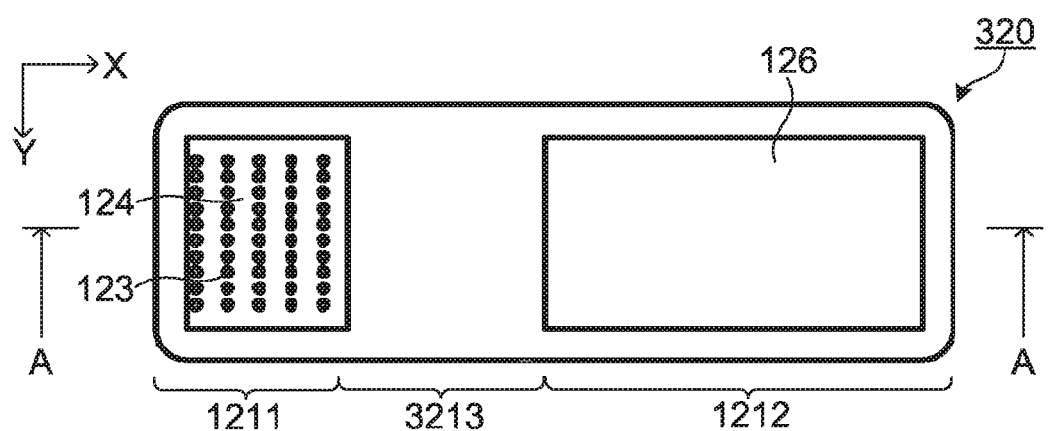
FIG. 13A is a bottom view of the dripper according to Embodiment 3.
Figure 13B:
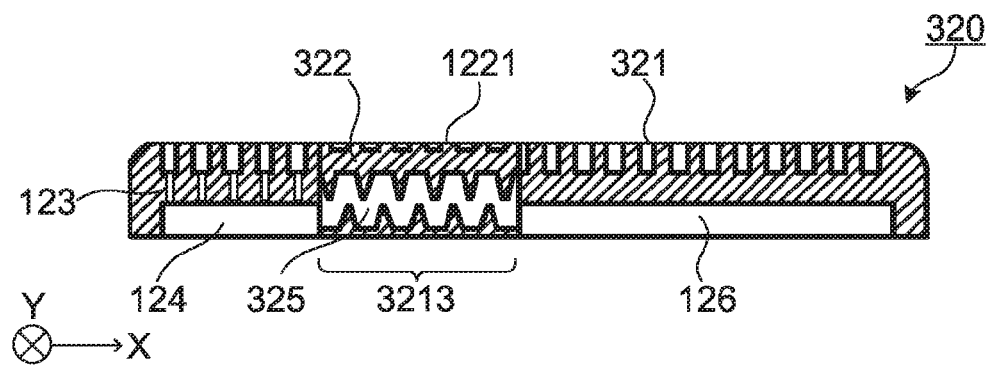
FIG. 13B is a cross-sectional view schematically illustrating the dripper cut along line A-A in FIG. 13A.
Figure 14A:
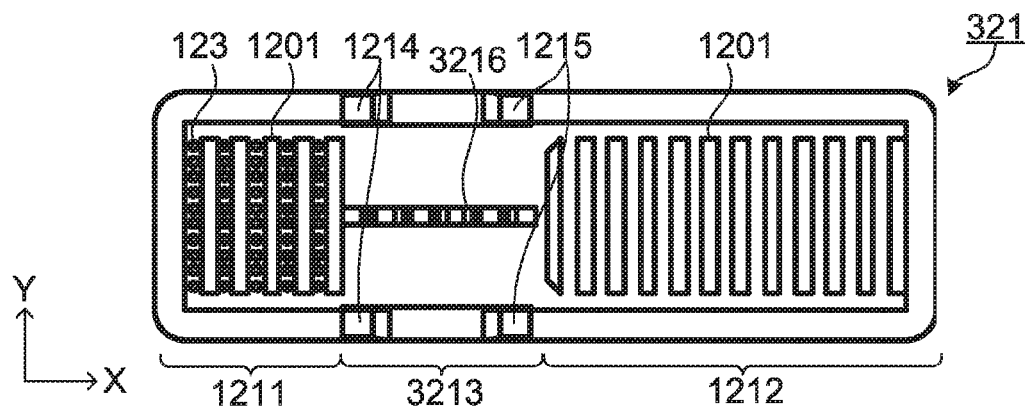
FIG. 14A to FIG. 14D are a plan view, a front view, a bottom view and a side view of a dripper body according to Embodiment 3, respectively.
Figure 14B:
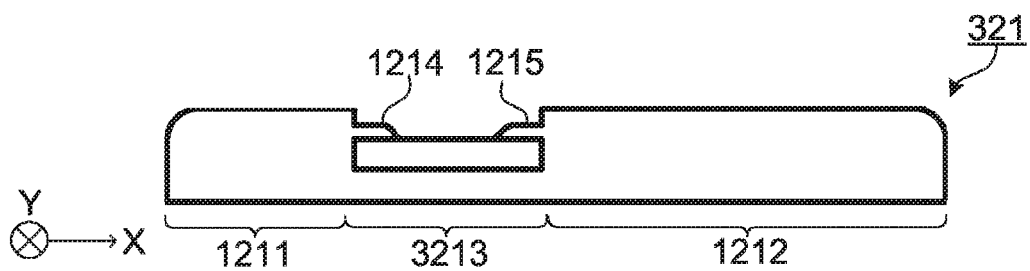
Figure 14C:
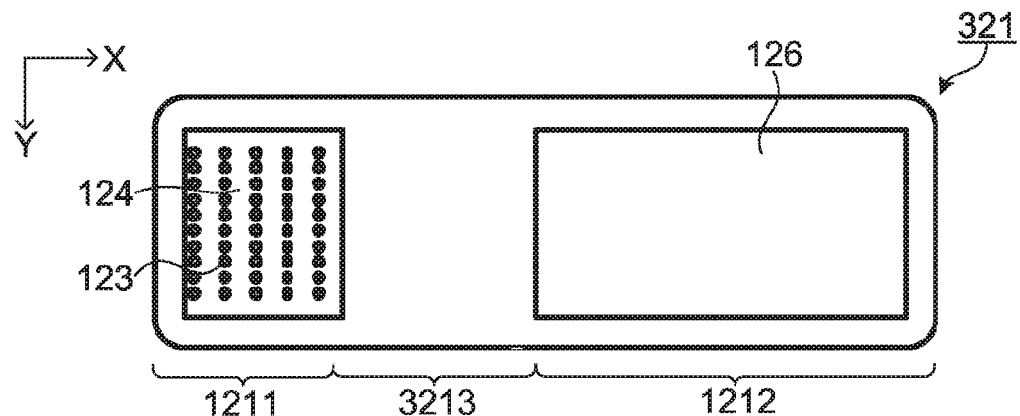
Figure 14D:
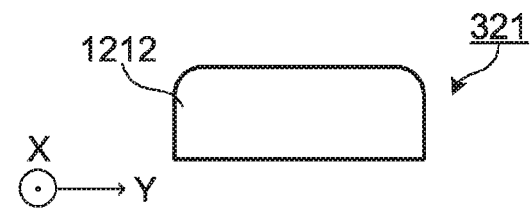

FIG. 12A illustrates an upper surface, a front surface, and a side surface of the dripper according to the present embodiment, and FIG. 12B illustrates a bottom surface, the front surface and the side surface of the dripper. FIG. 13A is a bottom view of the dripper according to Embodiment 3, and FIG. 13B is a cross-sectional view schematically illustrating the dripper cut along line A-A in FIG. 13A.

Dripper 320 is configured with dripper body 321 and movable part 322. Dripper 320 includes pressure reduction channel 325. The shape of pressure reduction channel 325 as seen in Y direction (shape of pressure reduction channel 325 in front view) is a zigzag shape. The zigzag shape is the same as the shape of pressure reduction channel 125 in Embodiment 1 in plan view.

FIG. 14A to FIG. 14D are a plan view, a front view, a bottom view and a side view of the dripper body according to the present embodiment, respectively.

Dripper body 321 has first end part 1211, second end part 1212 and connecting part 3213. Connecting part 3213 includes open part 3216. Open part 3216 is a bottomed groove with a rectangular shape in plan view. The bottom shape of open part 3216 is such that a plurality of protrusions each having a substantially triangular prism shape are disposed at regular intervals in X direction. The width of open part 3216 (length in Y direction) is, e.g., 0.5 mm.

Figure 15A:
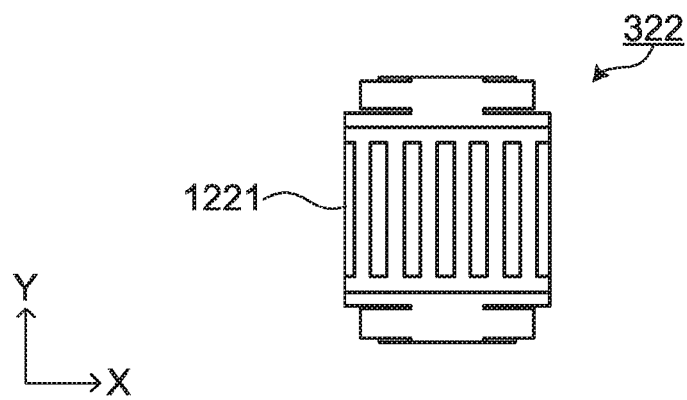
FIG. 15A to FIG. 15D are a plan view, a front view, a bottom view and a side view of a movable part according to Embodiment 3, respectively.
Figure 15B:
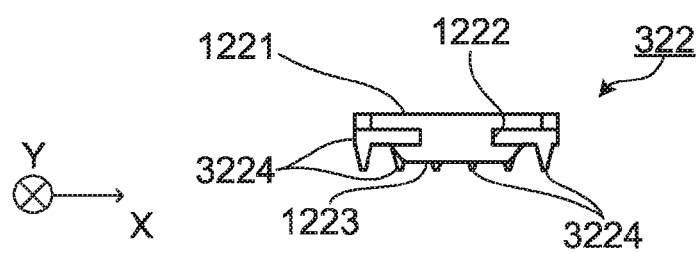

FIG. 15A to FIG. 15 are a plan view, a front view, a bottom view and a side view of a movable part according to the present embodiment, respectively.

Figure 15C:
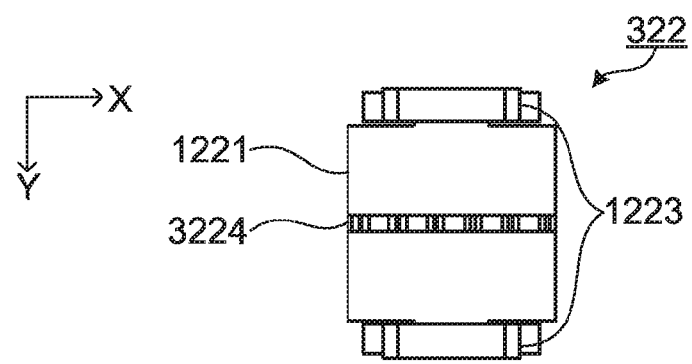
Figure 15D:
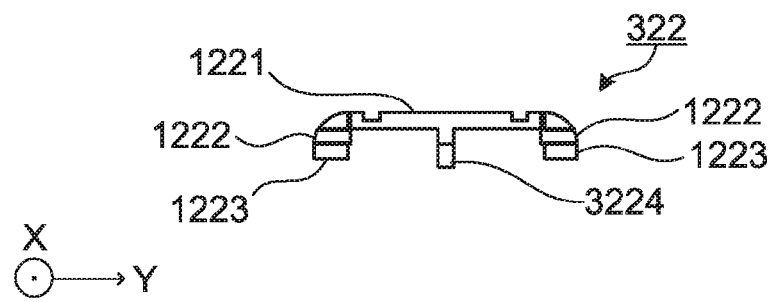

Movable part 322 is formed in the same manner as movable part 122 in Embodiment 1 except for projection 3224. The shape of projection 3224 in plan view is rectangular as with the shape of open part 3216 in plan view, as shown in FIG. 15C. The thickness of projection 3224 (length in Y direction) is, e.g., 0.49 mm. The edge shape of projection 3224 is such that a plurality of protrusions each having a substantially triangular prism shape are disposed at regular intervals in X direction. Each of the protrusions of projection 3224 is formed so as to be placed between every two protrusions of open part 3216 in X direction when movable part 322 is disposed in dripper body 321.

When movable part 322 is disposed in dripper body 321, projection 3224 covers open part 3216 from above and projection 3224 partially fits with open part 3216. The protrusions of open part 3216 and the protrusions of projection 3224 are disposed alternately in X direction to form pressure reduction channel 325 in the zigzag shape, and thus dripper 320 is formed (FIG. 13B).

Figure 16A:
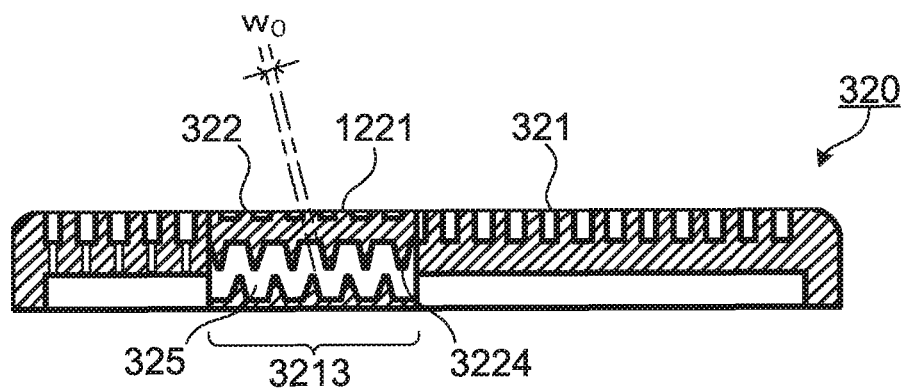
FIG. 16A is a cross-sectional view schematically illustrating the dripper according to Embodiment 3 cut along line A-A in FIG. 13A before the movement of the movable part.
Figure 16B:
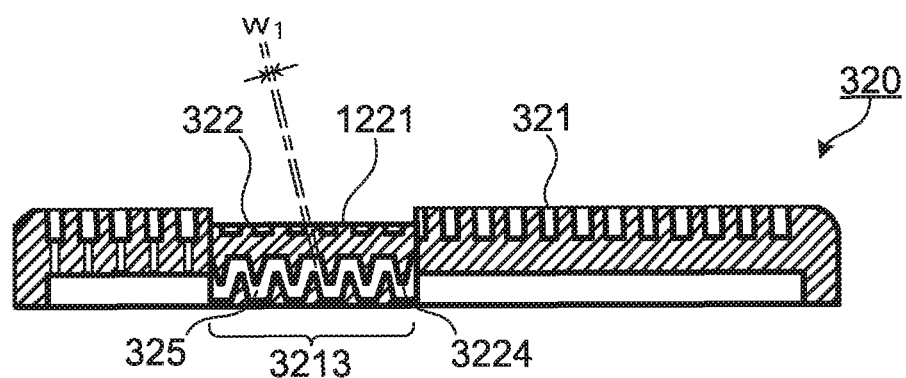
FIG. 16B is a cross-sectional view schematically illustrating the dripper cut along line A-A in FIG. 13A after the movement of the movable part.

FIG. 16A is a cross-sectional view schematically illustrating the dripper according to Embodiment 3 cut along line A-A in FIG. 13A before the movement of the movable part, and FIG. 16B is a cross-sectional view schematically illustrating the dripper cut along line A-A in FIG. 13A after the movement of the movable part.

When a sufficient pressure is not exerted on pressure receiving part 1221, movable part 322 does not move as shown in FIG. 16A. In this case, width $w_0$ of pressure reduction channel 325 is 0.5 mm for example, and the cross-sectional area of pressure reduction channel 325 has a maximum value. The width of pressure reduction channel 325 is the distance between parallel inclining surfaces of the protrusion of connecting part 3213 and the protrusion of movable part 322.

When a sufficient pressure is exerted on pressure receiving part 1221, movable part 322 is biased to the bottom surface side of dripper 320 and moved to the bottom surface side. Projection 3224 slides further into open part 3216. Width $w_1$ of pressure reduction channel 325 in this case is smaller than $w_0$ and 0.3 mm for example. The cross-sectional area of pressure reduction channel 325 has a minimum value in this case.

The present embodiment provides the same effects as those of Embodiment 1. Since the shape of pressure reduction channel 325 of dripper 320 according to the present embodiment in plan view is rectangular, dripper body 321 and movable part 322 can be easily assembled.

Further, pressure reduction channel 325 is expected to have an excellent self-cleaning function since the width of zigzag shaped pressure reduction channel 325 changes. This is because liquid flow turbulence in a depression between the protrusions of pressure reduction channel 325 changes according to the movement of movable part 322 (change in the width of pressure reduction channel 325) whereby a floating object stayed in the depression can easily flow out of the depression.

Further, pressure reduction channel 325 is configured with only dripper body 321 and movable part 322, without bonding dripper 320 to tube 110. With this configuration, the cross-sectional area of pressure reduction channel 325 is maintained at a constant value regardless of the depth of the bonding of dripper 320 to tube 110 or the ease of deformation of tube 110. Therefore, dripper 320 is more effective from the perspective of further uniformizing the cross-sectional areas of pressure reduction channels 325 of drippers 320 in drip irrigation tube 100.

While the embodiments of the present invention have been described hereinabove, the scope of the present invention is not limited thereto.

For example, tube 110 may be a seamless tube, or a tube made by joining slender sheets along the longitudinal direction.

While, a dripper is disposed such that the inflow part is located on the upstream side in the liquid flow direction in the tube in the above-mentioned embodiments, the dripper may be disposed such that the inflow part is located on a downstream side. The orientations of the drippers may be identical to each other or different from each other.

While the low-pressure stopping function based on dripper body material (polypropylene) is imparted to the dripper in the above-mentioned embodiments, the low-pressure stopping function may be imparted by forming a burr protruding to the inner space of the tube from the open part edge on the top surface side of an inflow port, or by covering the open part edge and internal wall of the inflow port with a hydrophobic film. The low-pressure stopping function can be further enhanced by combining multiple methods of imparting the low-pressure stopping function.

While the same material (polypropylene) is used for the dripper body and the movable part in the embodiments, different materials may be used.

Methods other than the method of changing the height of the pressure reduction channel or the communication channel may be employed to change the cross-sectional area of the channel formed in the dripper. For example, the cross-sectional area may be changed using a straightening plate or a baffle plate which is movable forward or backward in the pressure reduction channel or the communication channel While the movable part is moved forward or backward in the open part of the dripper body with plate springs formed on the dripper sides in accordance with the liquid pressure in the tube in the above-mentioned embodiments, any other means may be employed to move the movable part in accordance with the pressure. For example, it is also possible to move the movable part forward or backward in the open part by employing a movable part composed of an elastic body and expanding or contracting the elastic body in accordance with the pressure.

This application claims priority based on Japanese patent Application No. 2013-174417, filed on Aug. 26, 2013, and Japanese patent Application No. 2013-198306, filled on Sep. 25, 2013, the entire contents of which including the specifications, the drawings and the abstracts are incorporated herein by reference.

INDUSTRIAL APPLICABILITY

According to the present invention, it is possible to easily provide drippers capable of dripping liquid at a suitable rate using the pressure of the liquid to be dripped. Therefore, further widespread use of such drippers in the technical field of drip irrigations and endurance tests for drippers where a long term dripping is required can be expected, and further development in the technical field can be expected.

REFERENCE SIGNS LIST

100 Drip irrigation tube
110 Tube 120, 220, 320 Dripper
121, 221, 321 Dripper body
122, 222, 322 movable part
123 Inflow port
124 Inflow part
125, 225, 325 Pressure reduction channel
126 Ejection part
130 Through hole
226 Communication channel
1201 Linear protrusion
1211, 2211 First end part
1212 Second end part
1213, 2213, 3213 Connecting part
1214, 1215 Elastic supporter
1216, 2216, 3216 Open part
1221 Pressure receiving part
1222 Spacer
1223 Engaging part
1224, 2224, 3224 Projection

The invention claimed is:

1. A dripper configured to form a channel by bonding to an inner wall of a tube at a position where the dripper covers a through hole formed on a wall of the tube, the channel allowing a space in the tube and the through hole to communicate with each other and including a pressure reduction channel that allows liquid flowing into the dripper from the space to flow toward the through hole while depressurizing the liquid, the dripper comprising:

a dripper body configured to form the channel including the pressure reduction channel having a zigzag shape by bonding to the inner wall of the tube, the pressure reduction channel including an open part which opens to the space; and a movable part for changing a cross-sectional area of the pressure reduction channel at the open part in accordance with a pressure of the liquid in the space, the movable part disposed to cover the open part from a space side such that the movable part is movable forward or backward in the open part in accordance with the pressure of the liquid in the space;

wherein the movable part comprises a projection having a zigzag shape corresponding to the zigzag shape of the pressure reduction channel in which a part of the projection covers and fits into the zigzag shape of the pressure reduction channel, and the projection moves forward or backward in the open part in accordance with the pressure of the liquid in the space, thereby changing a cross-sectional area of the pressure reduction channel.

2. The dripper according to claim 1, wherein:

the channel includes an inflow part that receives the liquid flowing from the space, the pressure reduction channel connected to the inflow part, and an ejection part that is connected to the pressure reduction channel and receives depressurized liquid.

3. The dripper according to claim 2, wherein:

the dripper body further includes an inflow port that allows the space and the inflow part to communicate with each other; and the inflow port has a low-pressure stopping function to allow for inflow of a liquid having a pressure equal to or higher than a set value in the space.

4. A drip irrigation tube comprising:

a tube; and the dripper according to claim 1 bonded to the inner wall of the tube.

* * * * *